United States Patent [19]

Peloza

[11] Patent Number: 4,478,365
[45] Date of Patent: Oct. 23, 1984

[54] WATER VALVE WITH HEAT TRANSFER SOCKET

[75] Inventor: Kirk B. Peloza, Glen Ellyn, Ill.

[73] Assignee: Eaton Corporation, Cleveland, Ohio

[21] Appl. No.: 494,694

[22] Filed: May 18, 1983

Related U.S. Application Data

[63] Continuation of Ser. No. 219,644, Dec. 24, 1980, abandoned.

[51] Int. Cl.³ .................... B60H 1/00; F28F 27/00
[52] U.S. Cl. ............................ 236/38; 165/42; 340/593; 374/145
[58] Field of Search ............ 374/144, 145; 165/39, 165/41, 42; 236/22, 38, 78 A; 340/593

[56] References Cited

U.S. PATENT DOCUMENTS

| | | | |
|---|---|---|---|
| 1,431,212 | 10/1922 | Boyce | 374/145 |
| 2,080,600 | 5/1937 | Bremer | 73/347 X |
| 3,377,545 | 4/1968 | Tveit | 165/26 X |
| 3,388,860 | 6/1968 | Kruper | 236/38 X |
| 3,543,840 | 12/1970 | Chambers | 165/39 |
| 4,058,014 | 11/1977 | Durand | 73/346 X |
| 4,069,712 | 1/1978 | Armstrong et al. | 374/145 X |
| 4,206,645 | 6/1980 | Orcutt | 73/349 |
| 4,299,117 | 11/1981 | Andrews et al. | 374/145 X |

FOREIGN PATENT DOCUMENTS

| | | | |
|---|---|---|---|
| 2804558 | 9/1979 | Fed. Rep. of Germany | 73/347 |
| 659484 | 6/1929 | France | 236/22 |

Primary Examiner—Daniel M. Yasich
Attorney, Agent, or Firm—C. H. Grace; R. A. Johnston

[57] ABSTRACT

A water valve is disclosed for use in passenger vehicle heating systems. The valve includes a cylindrical metallic socket having a heat accepting surface portion connected to the valve housing and in fluid communication with fluid flowing through the valve. The position of the heat accepting surface portion relative to a rotatable butterfly valve member results in a vortex flow condition across the face of the heat accepting surface portion, thereby providing fast heat transfer from the fluid to the socket.

7 Claims, 2 Drawing Figures

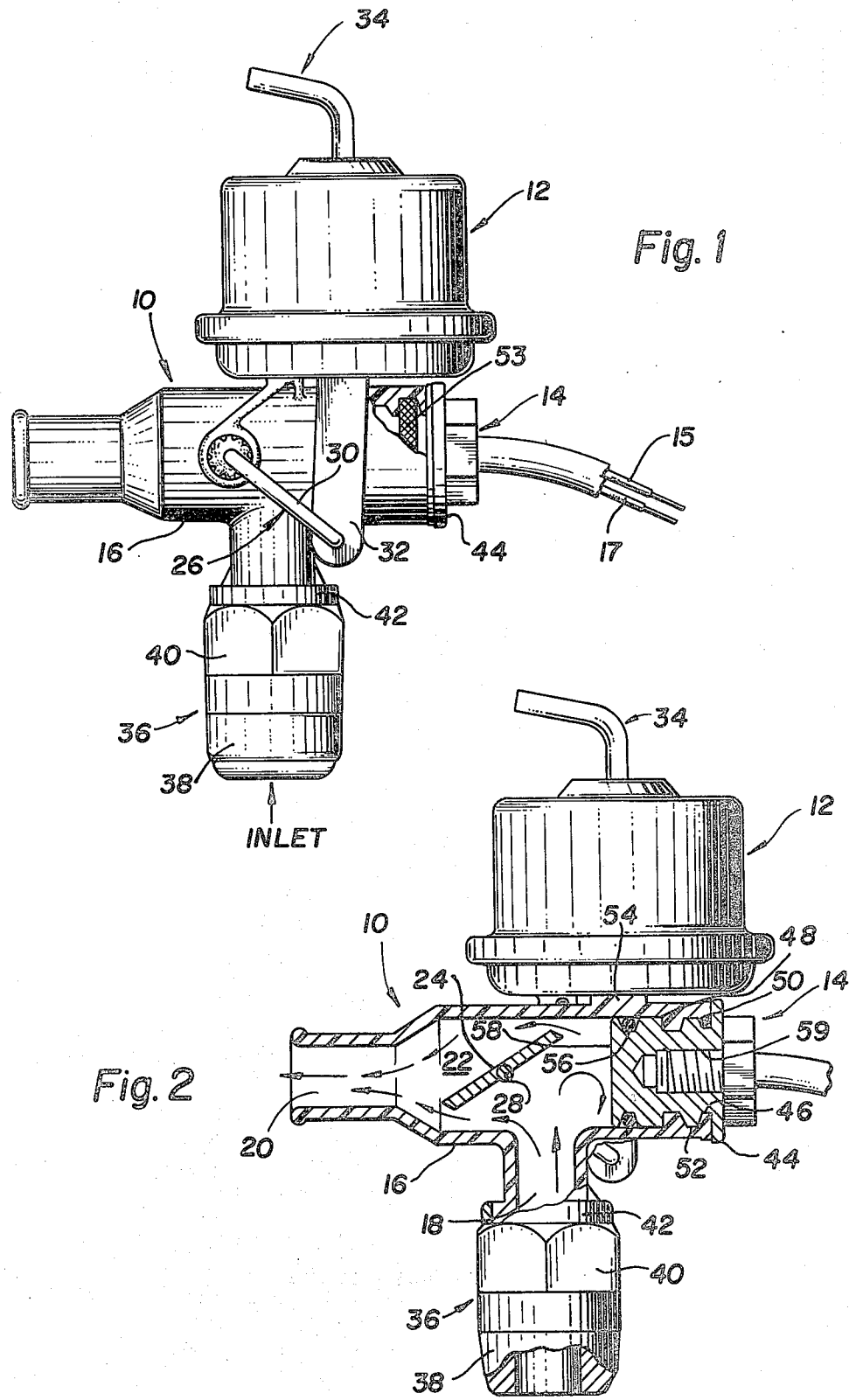

_4,478,365_

WATER VALVE WITH HEAT TRANSFER SOCKET

This is a continuation of Ser. No. 219,644, filed Dec. 24, 1980, now abandoned.

BACKGROUND OF THE INVENTION

This invention relates to fluid valves adapted for sensing the temperature of fluid passing therethrough and is particularly directed to water valves for use in vehicle passenger compartment heating systems.

DESCRIPTION OF THE PRIOR ART

Water valves for use in conjunction with passenger vehicle internal combustion engine cooling systems which incorporate sockets or inserts formed of materials having high thermal conductivity are known in the art. Valves of this type function to direct heated engine coolant to a heater core positioned in an ambient air duct of the vehicle heating system.

A socket or insert for the aforementioned type valve is generally formed of a suitable metallic material having a high thermal conductivity and is typically adapted for receiving a temperature sensitive switch which closes in response to the temperature of the fluid flowing through the valve. The output from the temperature through the valve. The output from the temperature swtich in a typical passenger vehicle cooling system application controls a blower motor which forces air over the heater core.

In the typical vehicle heating system the temperature switch remains open until the coolant temperature rises above a predetermined value, thus preventing blower operation and introduction of cold air to the passenger compartment.

In one such prior art valve, a heat transfer socket has a heat accepting surface portion in fluid communication with a portion of the valve chamber but located in a position spaced from the primary flow path through the valve. Since the socket face located in a position removed from contact with the relatively higher flow velocity of the primary flow stream, the heat transfer to the socket proceeds at a rate slower than an optimum attainable value. As a result, the time delay prior to energization of the blower fan is unnecessarily prolonged, since the engine coolant temperature will have already been at a level suitable for heat transfer to the heater core.

A need has thus arisen in vehicle passenger compartment heating systems for a water valve having a fast heating socket adapted for connection to a temperature sensitive switch.

SUMMARY OF THE INVENTION

In the present invention a water valve is provided having a heat transfer socket which provides a mounting location for a temperature sensitive switch. The socket, which functions as a heat sink, includes a heat accepting surface in contact with fluid flowing through the valve. The heat accepting surface is positioned closely adjacent a rotatably mounted butterfly valve member in order to maximize the heat transfer rate to the heat accepting socket.

In the preferred form of the invention the valve assembly comprises a housing defining a fluid inlet, a fluid chamber, and a fluid outlet. The butterfly valve member is positioned in the fluid chamber. When the valve is in the open position, fluid flowing through the valve is deflected by the butterfly to the heat accepting surface of the socket in such a manner that a vortex-like flow condition is established over the surface thereof. As a result of the vortex flow condition, the velocity of the heated fluid from the engine cooling system relative to the exposed heat transfer surface of the socket is relatively high, thereby resulting in relatively fast heating of the socket. The resultant increased heat transfer rate to the socket provides more rapid response of the temperature sensitive switch and ultimately provides an improvement in passenger comfort without significant change in cost of the valve.

It is therefore an object of the invention to provide a water valve having a temperature sensor heat transfer socket positioned relative to flow through the valve for achieving a maximum heat transfer rate thereto.

It is another object of the invention to provide a valve having the characteristic described above which is low in cost and easy to manufacture.

DESCRIPTION OF THE DRAWINGS

FIG. 1 is a view in elevation of a water valve embodying the principles of the invention; and, FIG. 2 is a view similar to FIG. 1 in partial cross-section showing the flow path through the valve and the position of the heat transfer socket relative to the butterfly valve member in the open position.

DETAILED DESCRIPTION

Referring now to FIGS. 1 and 2, there is indicated generally by reference numeral 10 a water valve embodying the principles of the invention shown in association with a vacuum motor indicated generally at 12, and a temperature sensor indicated generally at 14.

Valve 10 includes a housing 16 molded of a suitable thermoplastic material. Housing 10 defines a fluid inlet 18, a fluid outlet 20, and a fluid chamber 22 intermediate the inlet and outlet. In the preferred form of the invention, inlet 18 and outlet 20 are aligned generally perpendicularly and fluid chamber 22 is defined at the intersection thereof.

A disc-shaped butterfly valve member 24 is mounted in fluid chamber 22 by means of a crank indicated generally at 26 in FIG. 1 and includes a first portion 28 connected to valve member 24 and a second portion 30 extending exteriorly of housing 16.

Vacuum motor 12, which may be of the well known spring loaded diaphragm type, is employed in the well known manner for power operation of the heater water valve and includes an output member 32 connected to the free end of crank second portion 30. A nipple portion 34 extends from the upper end of motor 12 and is connectable to a suitable engine vacuum source. Upon introduction of an appropriate varying condition or vacuum signal at nipple 34, output member 32 is moved upwardly thereby rotating crank 26 counterclockwise and rotating valve member 24 to a closed position.

A metallic fitting, indicated generally at 36, is connected to the inlet 18 end of the valve housing and includes a lower threaded portion 38, a wrench flat portion 40 for facilitating connection of the valve to a suitable location on an engine block, and a swaged portion 42 which clamps the fitting to the lower end of the housing inlet.

A temperature sensitive switch or sensor indicated generally at 14 (details omitted) having electrical leads as denoted at 15, 17, is shown as connected to a metallic heat transfer socket or insert means 44 which extends into an opening 46 formed in the right end of housing 16. As mentioned above, the sensor is adapted for connection via the illustrated electrical leads to a blower (not shown) for the passenger compartment heater and selectively turns the blower ON and OFF. Socket 44 is secured to the housing by means of heat forming the housing plastic material into a pair of adjacent annular grooves 48 and 50 which are separated by an annular rib 52. The outer circumferential surface of rib 52 is knurled to provide co-acting locking surfaces between the socket and wall as denoted by reference numeral 53 to resist twist-off of the socket. Socket 44 is sealingly connected to the housing by means of an annular sealing ring 54 mounted in a groove 56 formed adjacent the left end of the socket. The left end of temperature sensitive switch 14 is threaded and received in an internally threaded bore 59 formed in the socket.

The functioning of the vacuum motor 12 and sensor 14 may be independent or related dependent upon the particular engine installation. However, the vacuum motor 12 is illustrated only for reference purposes and forms no part of the present invention.

Socket 44 includes a heat transfer surface portion 58 spaced closely adjacent valve member 24. Flow through valve 10 is indicated schematically by black arrows in FIG. 2, wherein butterfly valve member 24 is shown in the open position. A portion of the cooling fluid entering inlet 18 impinges on valve member 24 and is to flow along the valve 24 and in a direction generally opposing flow along heat transfer surface 58 resulting in a vortex-like flow pattern as shown by FIG. 2. The turbulent flow which results in rapid heat transfer to socket 44 which results in a rapid temperature rise in the socket.

Valve member 24 thus performs the dual functions of valving flow in passage 22 and inducing a vortex-like flow pattern which is highly effective in transferring heat from the fluid to socket 44.

It will be understood to those having ordinary skill in the art that modifications and variations of the invention may be made without departing from the scope of the invention which is described in the following claims.

What is claimed is:

1. A fluid valve, said valve comprising:
 (a) plastic housing means, said housing means including structure defining,
  (i) a fluid inlet,
  (ii) a fluid outlet,
  (iii) a fluid chamber communicating with said inlet and said outlet,
 (b) valve means disposed in said fluid chamber and movable between an open and closed position for valving fluid flow to said outlet in response to a varying condition
 (c) socket means formed of metal and received in an opening in the wall of said chamber, said socket means including;
  (i) structure defining a heat accepting surface portion in contact with fluid flowing through said fluid chamber, said socket means defining a bore having heat transmitting surfaces therein,
  (ii) an annular recess having received therein a portion of the plastic material of said housing for preventing removal of said socket means;
  (iii) locking surface means engaging said chamber wall and operable for preventing rotation of said socket means in said opening with respect to said wall;
 (d) seal means operable to prevent fluid passage between said socket means and said housing means;
 (e) temperature sensing means disposed at least partially in said bore and operatively receiving heat from said heat transmitting surfaces, said temperature sensing means being adapted for electrical connection to means for selective control thereo; and
 (f) said valve means including a valve member spaced closely adjacent said heat accepting surface portion, said valve member including a fluid deflecting surface portion operable when said valve means is in said open position to deflect a portion of the flow through said chamber to create a vortex for effecting rapid heat transfer between the fluid and said socket means.

2. The device as defined in claim 1 wherein:
 (a) said valve member has a disc-shaped configuration and said fluid deflecting portion comprises a flat surface thereof; and
 (b) said heat accepting surface portion of said insert means and said fluid deflecting surface portion of said member define a generally converging passageway in said fluid chamber.

3. The device as defined in claim 1 wherein;
 (a) said housing means includes an opening aligned with said fluid chamber; and
 (b) said socket means includes a cylindrical member received in said housing means opening, said heat accepting surface portion defined by an end surface portion of said cylindrical member.

4. The device as defined in claim 1 wherein;
 (a) said housing is formed of a thermoplastic material; and
 (b) said socket means is formed of steel.

5. The device defined in claim 1, wherein said heat accepting surface portion is disposed generally parallel with the direction of flow into said chamber from said inlet.

6. The device defined in claim 1, wherein said valve member has a flat surface and with said valve means in the open position said flat surface is disposed at an angle to the direction of flow into said chamber.

7. A fluid valve comprising:
 (a) housing means formed of plastic material and including structure defining,
  (i) a fluid inlet,
  (ii) a fluid outlet,
  (iii) a fluid chamber communicating with said inlet and said outlet,
 (b) valve means disposed in said fluid chamber and movable between an opened and closed position for valving flow to said outlet in response to a varying condition;
 (c) socket means formed of metal and received through the wall of said chamber, said socket means including,
  (i) structure defining a heat accepting surface portion in contact with fluid flowing through said fluid chamber, said socket means defining a bore having heat transmitting surfaces,
  (ii) an annular recess having disposed about the outer periphery received therein a portion of the plastic material of said housing for preventing removal of said socket means,
  (iii) locking surface means engaging said chamber wall and operable to co-act therewith for preventing rotation of said socket means with respect to said wall; and,
(d) seal means operably disposed to prevent fluid passage between said socket means and said housing means; and,
(e) temperature sensing disposed at least partially in said bore and operatively receiving heat from said heat transmitting surfaces, said temperature sensing means being adapted for electrical connection to means for selective control thereo.

* * * * *